3,342,759
SELF-CONTAINED INKING MATERIAL AND PROCESS FOR MAKING SAME
Charles D. Short and Eugene E. McCarthy, Rochester, N.Y., assignors, by mesne assignments, to Kee Lox Manufacturing Company, Rochester, N.Y., a corporation of Pennsylvania
No Drawing. Filed June 4, 1962, Ser. No. 199,664
2 Claims. (Cl. 260—2.5)

The present invention relates to the production of a material which is resilient, has a porous structure and good abrasion resistance. More particularly the invention relates to the production of ink-carrying materials for use in stamp pads, in typewriter ribbons, in ink rolls for various forms of marking machines including postage meters, bookkeeping machines, endorsing equipment, etc.

It is known to provide sponge-like material for printing plates and ink pads which will retain ink, but the number of impressions that can be made from previously known ink-carrying materials are limited. Moreover, considerable pressure must be applied to the materials to effect inking of a stamp or plate. Furthermore, the sponge-like ink-carrying materials heretofore known abrade relatively rapidly and are costly.

One object of the present invention is to provide a self-contained inking material which has elasticity but which has also structural strength and durability.

Another object of the invention is to provide an inking material capable of carrying a relatively large amount of ink so as to be able to make thousands of impressions without appreciable variation in the appearance of the impressions from first to last.

Another object of the invention is to provide an inking material which will supply ink to a stamp or plate with very slight pressure.

Another object of the invention is to provide an inking material with which good control may be had over the release characteristics of the ink so that a fairly even density of impression is obtained through the life of the roll.

Still another object of the invention is to provide an inking material having low cost, improved inking qualities and ease of manufacture.

In a broader aspect it is an object of the invention to provide an improved resilient, porous material in which various other materials can be carried, whether in liquid, paste, or solid form, and from which these other materials can readily be dispensed by pressure, and, if required, after wetting of the porous carrier.

Other objects of the invention will be apparent hereinafter from the specification and from the recital of the appended claims.

We shall first describe the invention in connection with the production of an inking material.

Rubber is perhaps the oldest resilient material known to man.

As a base for our ink-carrying material we use a depolymerized rubber compound, either natural or synthetic, mix with it a suitable fluid coloring material used for writing and printing and commonly referred to as ink. The inks suitable for the purposes of this invention are those which are not compatible to rubber, meaning that while they can be mixed with the liquid isoprene, at no time during either of the processing steps or after completion of the finished product will the ink lose its separate identity, by any form of interaction with the isoprene. Thus, upon formation of the finished product, the ink or coloring fluid may be expelled from the isoprene dispenser by simple pressure. An example of such inks are glycol based inks, that is, those based on liquid glycols and glycol ethers, which have been suitably colored with either pigments or dyes or a combination of the two. The depolymerized rubber compound, which may be either a low viscosity or a high viscosity compound or a mixture of the two is mixed in liquid form with the ink and the mixture is poured and/or forced into a mold, and then cured either at room temperature or, if it is desired to accelerate the cure, the material in the mold is subjected to an elevated temperature. When the cure is completed, the ink is encapsulated in the material which is now a self-contained ink dispenser, comprising a molded piece of vulcanized isoprene rubber conforming to the contours of the mold in which it was formed and containing large quantities of colored marking fluid or ink, which can be expressed from the isoprene by simple pressure.

*Example 1*

In one embodiment of our invention, 30 parts by weight of a glycol based ink having any desired type and color of dye and/or pigmentation dissolved or suspended therein is mixed with—

(A)

| | Parts by weight |
|---|---|
| A depolymerized rubber compound | 18.0 |
| A curing compound such as P-quinone dioxime | 2.0 |
| A filler, such as silica or clay or calcium carbonate, zinc oxide, zinc sulfide, carbon black, etc. | 15.0 |
| A dispersing agent, such as an amino oleate | 8.0 |

(B)

| | |
|---|---|
| An actuator, such as lead dioxide | 10.0 |
| A dispersing agent, such as dibutyl phthalate | 5.0 |

The ink is blended with part A which remains stable. Part B is then blended into the mixture and the whole is then poured into a mold. It can be cured in two hours at atmospheric pressure or introduced pressure and at room temperature; but, if it is desired to accelerate vulcanization, this can be accomplished by heating the mold. With heat, vulcanization can be effected in as little as one quarter of an hour.

After curing, the vulcanized isoprene dispenser containing the ink is easily removed from the mold. It conformed to the shape of the mold.

The glycol base ink wets the calcium carbonate, or other filler, but has no affinity for it, or for any of the other constituents of the mix. Hence, the ink is trapped in the pores in the rubber.

The actuator of part B above can be used with or without a dispersing agent.

One formula for an ink which may be used is:

| | Parts |
|---|---|
| Phenyl Cellosolve (ethylene glycol monophenyl ether) | 60 |
| Hexanetriol | 20 |
| "Iosol" Red Dye which is a red dye prepared from the condensation of p-phenylazoaniline (Acid Red No. 73–CI No. 27290) with an amine alkyl | 15 |
| "Polar Red B Super" (p-amino-N-ethyl-N-1-naphthylbenzamide N-benzoyl-K acid) | 15 |
| Lumigraphic Red Pigment X-2489 (a color lake composed of a fluorescent dye on a metal resinate base, supplied by Imperial Color & Chemical Company) | 5 |

The amino oleate toughens the surface of the inking material as well as acting as a dispersing agent. Oleic acid and/or triethanolamine can be used instead. The degrees of resiliency and of porosity of the material can be varied by varying the ratio of depolymerized rubber and of filler used in the mixture.

*Example 2*

The same ingredients and in the same amounts by weight as in Example 1 except that a hydrocarbon solvent, such as toluene, xylene, benzene, etc. is added to part A of the mix prior to the mixing of parts A and B. These hydrocarbon solvents are volatile and it has been found that when the material is being cured the toluene, or other hydrocarbon solvent, is driven off and in this way forms holes in the material and increases its porosity. Toluene has been added in the proportion of 5 to 10 parts by weight. The more the toluene, that is added, the more or the larger are the pores in the finished product; and the darker the material writes. However, the faster it wears out also.

*Example 3*

(A)

|  | Parts by weight |
|---|---|
| Ink, as in Example 1 | 150.0 |
| Depolymerized rubber | 100.0 |
| d-Limonene (para menthadiene) | 10.0 |
| Zinc oxide | 8.0 |
| p-Quinone dioxime | 8.0 |

(B)

| | |
|---|---|
| Lead dioxide | 20.0 |
| Dibutyl phthalate | 10.0 |

The zinc oxide and the ink are mixed together. The depolymerized rubber and the d-limonene are mixed separately together. Then the two mixtures are mixed; and then the p-quinone dioxime is added. Then part B is mixed with part A; the whole is poured into a mold and cured as in Example 1.

Self-contained inking material produced according to the present invention has numbers of minute intercommunicating pores and the ink permeates all these pores, so that the material can carry relatively a vast store of ink. A slight pressure upon the material will release sufficient ink to make a clear impression. The material can carry varying quantities of ink. It has been found preferable, however, to keep the ink content between 35% and 45% by volume of the volume of the material. Greater ink content tends to reduce the strength of the material and decreases its useful life.

While it is preferred at present to use the ingredients of part B in the above examples as the curing agent, it is possible also to use sulfur for vulcanization by increasing the curing temperature to the range necessary for the type of rubber being used and using atmospheric or introduced pressure.

The self-contained ink material of the present invention can be coated or extruded on paper to form carbon paper. It can be made in long strips to provide a rubber typewriter ribbon. It can also be coated on fabric to make typewriter ribbons. It can be used instead of an ink fountain in lithographic presses. It can be used in rubber stamps, thereby eliminating the necessity for ink pads. It can be used, however, in ink pads themselves. It can be used instead of felt ink pads on marking machines. It can be made into marking pens. It can be used in any application where ink is used or in place of a vessel for holding ink.

The invention is not restricted, however, to the making of inking materials. Various materials, organic and inorganic, other than ink, may be incorporated in resilient, porous material by the process of the present invention by substituting a desired ingredient for the ink and otherwise following generally the steps described above for the manufacture of the inking material. There is one limitation, however; the desired ingredient must be incompatible with the rubber, that is, it must co-exist but not interact with the rubber.

Thus the invention might be used also in the manufacture of self-contained paint rollers. The paint can be incorporated instead of ink in the resilient, porous material from which the roller is made; and movement of the roller over a surface with pressure will cause the paint to be applied to the surface. The roller can be discarded when the paint supply in it is exhausted.

The paint or dye can be in powder form, and can be incorporated in the rubber base by using a volatile material such as toluene to provide a liquid vehicle for carrying the powdered paint or dye into the rubber. Upon vulcanization the toluene will be driven off, leaving the powder in the interstices of the sponge material. The powder can then be activated by dipping the carrier in water or other suitable liquid to dissolve the paint or dye for application to a surface.

Similarly a glue or adhesive may be incorporated in the material instead of ink. This glue or adhesive can be in liquid, paste or solid form. A dry adhesive, for instance, can be contained in the pores of the resilient, spongy material and can be activated by dipping the carrier in water or a suitable liquid solvent. A resilient, spongy material so made can be used for sealing envelopes, for instance; and it is not necessary then to put a glue on the flap of an envelope when it is made. When the adhesive is in paste or solid form it may be desirable to employ a dispersing agent with it so that it will be contained within the rubber base. In this case, as in all instances where a dispersing agent is used, the dispersing agent must be compatible with the depolymerized rubber and also with the material which is introduced into the rubber.

The invention has wide application.

Thus, a material for treatment of cuts and wounds might be provided by substituting an antibiotic for ink in formulating material according to any of the preceding examples. This antibiotic might be in the form of a liquid or a water-soluble powder. The powder might be released by wetting the resilient porous material after it had been cured with the powder incorporated therein.

While the invention has been described then in connection with specific embodiments thereof and specific uses therefor, it will be understood that it is capable of further modification and uses, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described our invention, what we claim is:

1. A process for producing a self-contained inking material comprising
    (a) mixing with a liquid depolymerized polyisoprene,
    (b) a liquid glycol-based ink that, both during processing and after completion of the finished product, is noncompatible with the depolymerized polyisoprene but can be homogeneously suspended within the polyisoprene to be expressed therefrom under pressure, and
    (c) heating the mixture to vulcanize the mixture in a mold and to encapsulate in the pores of the vulcanized polyisoprene the ink so that the ink may be expressed therefrom by pressure.

2. A process according to claim 1 in which a volatile liquid, selected from the group consisting of toluene, xylene, and benzene, is added to the mixture, that is evaporated by the heat during vulcanization to render the mixture highly porous.

(References on following page)

References Cited

UNITED STATES PATENTS

| | | | |
|---|---|---|---|
| 2,253,991 | 8/1941 | Strachovsky | 260—730 |
| 2,393,321 | 1/1946 | Haworth | 260—94.8 |
| 2,639,998 | 5/1953 | Pavlic | 117—38 |
| 2,763,208 | 9/1956 | Rockoff et al. | 260—2.5 |
| 2,777,824 | 1/1957 | Leeds | 260—2.5 |
| 2,961,332 | 11/1960 | Narin | 260—2.5 |
| 3,019,201 | 1/1962 | Clancy et al. | 260—2.5 |
| 3,160,595 | 12/1964 | Hardman et al. | 260—4 |

FOREIGN PATENTS 622,914  5/1949  Great Britain.

MURRAY TILLMAN, *Primary Examiner.*

DONALD E. CZAJA, *Examiner.*

M. FOELAK, *Assistant Examiner.*